United States Patent
Maurer

(10) Patent No.: US 12,435,209 B2
(45) Date of Patent: Oct. 7, 2025

(54) LIQUID ADDITIVE COMPOSITION

(71) Applicant: AVIENT SWITZERLAND GMBH, Muttenz (CH)

(72) Inventor: Inga Maurer, Denver, NC (US)

(73) Assignee: Avient Switzerland GmbH, Muttenz (CH)

( * ) Notice: Subject to any disclaimer, the term of this patent is extended or adjusted under 35 U.S.C. 154(b) by 414 days.

(21) Appl. No.: 17/769,033

(22) PCT Filed: Oct. 15, 2020

(86) PCT No.: PCT/EP2020/079110
§ 371 (c)(1),
(2) Date: Apr. 14, 2022

(87) PCT Pub. No.: WO2021/074329
PCT Pub. Date: Apr. 22, 2021

(65) Prior Publication Data
US 2024/0101790 A1 Mar. 28, 2024

Related U.S. Application Data

(60) Provisional application No. 62/916,440, filed on Oct. 17, 2019.

(51) Int. Cl.
C08K 13/02 (2006.01)
C08J 3/22 (2006.01)
(Continued)

(52) U.S. Cl.
CPC ............ *C08K 13/02* (2013.01); *C08J 3/22* (2013.01); *C08J 5/18* (2013.01); *C08L 23/06* (2013.01); *C08L 27/16* (2013.01); *C08J 2323/06* (2013.01); *C08J 2423/20* (2013.01); *C08J 2427/16* (2013.01); *C08K 3/36* (2013.01); *C08K 5/13* (2013.01); *C08K 5/524* (2013.01); *C08K 2201/014* (2013.01); *C08L 2201/08* (2013.01); *C08L 2203/16* (2013.01); *C08L 2205/025* (2013.01); *C08L 2205/035* (2013.01); *C08L 2207/066* (2013.01); *C08L 2310/00* (2013.01)

(58) Field of Classification Search
CPC .... C08K 13/02; C08J 3/22; C08J 5/18; C08L 23/06; C08L 27/16
See application file for complete search history.

(56) References Cited

U.S. PATENT DOCUMENTS 4,863,983 A * 9/1989 Johnson ................. C08K 5/523
524/145
4,983,677 A 1/1991 Johnson et al.
(Continued)

OTHER PUBLICATIONS

International Search Report and Written Opinion dated Jan. 28, 2021, issued in corresponding International Patent Application No. PCT/EP2020/079110.

*Primary Examiner* — John E Uselding
(74) *Attorney, Agent, or Firm* — Morgan, Lewis & Bockius LLP

(57) ABSTRACT

A liquid additive composition containing a fluoropolymer; an organophosphite antioxidant; a sterically hindered phenol antioxidant; and one or more hydrocarbon polymer dispersants provided improved processing and product appearance in film applications, extrusion blow molding and as a masterbatch enhancer.

20 Claims, 2 Drawing Sheets

(51) Int. Cl.
*C08J 5/18* (2006.01)
*C08L 23/06* (2006.01)
*C08L 27/16* (2006.01)
C08K 3/36 (2006.01)
C08K 5/13 (2006.01)
C08K 5/524 (2006.01)

(56) References Cited

U.S. PATENT DOCUMENTS

| | | |
|---|---|---|
| 5,015,693 A | 5/1991 | Duchesne et al. |
| 5,550,193 A * | 8/1996 | Chiu .................. C08L 23/0815 524/400 |
| 6,294,604 B1 | 9/2001 | Focquet et al. |

* cited by examiner

LIQUID ADDITIVE COMPOSITION

BACKGROUND OF THE INVENTION

The present invention relates to fluoropolymer-containing additive compositions in liquid form useful in various applications such as in polymer preparation. In contrast, conventional fluoropolymer-containing additive compositions are typically available only in solid (e.g., pellet masterbatch) form. The liquid additive compositions of the invention solve unmet needs not possible with conventional solid additives by demonstrating unexpectedly superior performance in, for example, film (e.g., blown and cast) processing and appearance; extrusion blow molding; and as a masterbatch enhancer. This enhanced performance is likely due to the superior dispersibility of the liquid additive compositions, a more predictable amount of the fluoropolymer in the final product, no additive depletion during masterbatch compounding and no heat history.

SUMMARY OF THE INVENTION

An aspect of the present invention relates to an additive composition in liquid form comprising: a fluoropolymer; an organophosphite antioxidant; a sterically hindered phenol antioxidant; and one or more hydrocarbon polymer dispersants.

In an exemplary embodiment, the liquid additive composition has a viscosity in a range of 3000 to 20,000 centipoise, such as 4,000 to 18,000 centipoise, such as 5,000 to 16,000 centipoise, such as 6,000 to 15,000 centipoise.

In an exemplary embodiment, the fluoropolymer is present in an amount of 10 to 25 wt %, such as 12 to 22 wt %, such as 15 to 20 wt %.

In an exemplary embodiment, the organophosphite antioxidant is present in an amount of 15 to 35 wt %, such as 20 to 35 wt %, such as 20 to 30 wt %.

In an exemplary embodiment, the sterically hindered phenol antioxidant is present in an amount of 0.5 to 10 wt %, such as 2 to 8 wt %, such as 3 to 7 wt %.

In an exemplary embodiment, the one or more hydrocarbon polymer dispersants are present in an amount of 30 to 75 wt %, such as 35 to 65 wt %, such as 40 to 60 wt %, such as 45 to 55 wt %.

In an exemplary embodiment, the fluoropolymer is a polyvinylidene fluoride.

In a particular embodiment, the polyvinylidene fluoride is selected from Kynar Flex® 5300, Kynar Flex® 5301, Kynar Flex® 3121-50 and Kynar Flex® 2821.

Suitable organophosphite antioxidants include any commercially available organophosphite antioxidants. In a particular embodiment, the organophosphite antioxidant is one or more of Irgafos® 126 and Irgafos® 168.

In a particular embodiment, the sterically hindered phenol antioxidant is one or more of Irganox® 1010, Irganox® 1035, Irganox® 1076, Irganox® 1098, Irganox® 1135, Irganox® 1330, Irganox® 1425, Irganox® 1520 L, Irganox® 1726, Irganox® 245, Irganox® 245 DW, Irganox® 3114, Irganox® 565, Rianox (Thanox) 1076, Rianox (Thanox) 1098, Rianox (Thanox) 1790 and Rianox (Thanox) 3114.

In an exemplary embodiment, the liquid additive composition comprises a further antioxidant. In an exemplary embodiment, the further antioxidant is one or more of a thioether, a lactone, a hydroxylamine, a vitamin E derivative and a blended antioxidant.

In a particular embodiment, the thioether antioxidant is one or more of Irganox® PS 800 or Irganox® PS 802.

In an exemplary embodiment, the blended antioxidant is a blend of a sterically hindered phenol and an organophosphite. In a particular embodiment, the blended antioxidant is one or more of Irganox® B 215, Irganox® B 225, Irganox® B 561, Irganox® B 612 and Irganox® B 900.

In an exemplary embodiment, one or more of the hydrocarbon polymers is a polymerized C4-olefin. In a particular embodiment, the polymerized C4-olefin is polybutene. In a particular embodiment, the polybutene is one or more of Indopol® L-2, Indopol® L-3, Indopol® L-6, Indopol® L-8, Indopol® L-14, Indopol® H-7, Indopol® H-8, Indopol® H-15, Indopol® H-25, Indopol® H-50, Indopol® H-100, Indopol® H-300 and Indopol® H-1200. In an exemplary embodiment, the liquid additive composition comprises two different hydrocarbon polymers. In an exemplary embodiment, the liquid additive composition comprises three different hydrocarbon polymers. In a particular embodiment, the liquid additive composition comprises Indopol® L-14 and Indopol® H-25 (Add-Vis 18), where the Indopol® L-14 is present in an amount of 25 to 55 wt %, such as 30 to 50 wt %, such as 35 to 45 wt %, and the Add-Vis 18 is present in an amount of 1 to 12 wt %, such as 3 to 10 wt %, such as 4 to 8 wt %.

In an exemplary embodiment, the liquid additive composition comprises a further dispersant that is not a polymerized C4-olefin. In an exemplary embodiment, the dispersant that is not a polymerized C4-olefin is a polymeric dispersant. In a particular embodiment, the polymeric dispersant is one or more of Solplus™ K240, Solplus™ K241, Solplus™ K251, Solplus™ DP310, Solplus™ D320, Solplus™ D330 and Solplus™ DP700.

In an exemplary embodiment, the polymeric dispersant that is not a polymerized C4-olefin is present in an amount of 0.1 to 5 wt %, such as 0.3 to 5 wt %, such as 0.5 to 3 wt %, such as 0.5 to 2 wt %, such as 1 to 3 wt %.

In an exemplary embodiment, the liquid additive composition further comprises a flow promoter that also acts as a dispersion agent and a rheology modifier. In an exemplary embodiment, the flow promoter agent is a micronized polyethylene or polyethylene-containing wax. In a particular embodiment, the wax is one or more of Ceridust® 3715, Ceridust® 3716 TP, Ceridust® 3620, Ceridust® 5551 and Ceridust® 9615 A.

In an exemplary embodiment, the micronized polyethylene or polyethylene-containing wax is present in an amount of 0.5 to 6 wt %, such as 1 to 5 wt %, such as 2 to 4 wt %.

In an exemplary embodiment, the liquid additive composition further comprises a thickening/thixotropic/rheology agent. In a particular embodiment, the thickening/thixotropic/rheology agent is silica (such as amorphous fumed or colloidal silica). In a particular embodiment, the silica is HDK® N20.

In an exemplary embodiment, the silica is present in an amount of 0.05 to 5 wt %, such as 0.1 to 3 wt %, such as 0.3 to 1 wt %.

In an exemplary embodiment, the liquid additive composition further comprises one or more of an inorganic filler, an organic filler, a weatherproofing agent, a UV absorber, a thermal stabilizer, a light stabilizer, an antistatic, a pigment, an adsorbent, a lubricant and a silicone compound.

In an exemplary embodiment, the liquid additive composition comprises: a fluoropolymer; an organophosphite antioxidant; a sterically hindered phenol antioxidant; two different polymerized C4-olefin dispersants; a polymeric dispersant that is not a polymerized C4-olefin; a micronized polyethylene wax matting agent; and a thixotropic agent.

In an exemplary embodiment, the liquid additive composition consists essentially of: a fluoropolymer; an organophosphite antioxidant; a sterically hindered phenol antioxidant; two different polymerized C4-olefin dispersants; a polymeric dispersant that is not a polymerized C4-olefin; a micronized polyethylene wax matting agent; and a thixotropic agent.

In an exemplary embodiment, the liquid additive composition consists of: a fluoropolymer; an organophosphite antioxidant; a sterically hindered phenol antioxidant; two different polymerized C4-olefin dispersants; a polymeric dispersant that is not a polymerized C4-olefin; a micronized polyethylene wax matting agent; and a thixotropic agent.

In an exemplary embodiment, the liquid additive composition comprises: a polyvinylidene fluoride; an organophosphite antioxidant; a sterically hindered phenol antioxidant; two different polymerized C4-olefin dispersants; a polymeric dispersant that is not a polymerized C4-olefin; and one or more of a micronized polyethylene wax matting agent and silica as a thixotropic agent.

In an exemplary embodiment, the liquid additive composition consists essentially of a polyvinylidene fluoride; an organophosphite antioxidant; a sterically hindered phenol antioxidant; two different polymerized C4-olefin dispersants; a polymeric dispersant that is not a polymerized C4-olefin; a micronized polyethylene wax as a matting agent; and silica as a thixotropic agent.

In an exemplary embodiment, the liquid additive composition consists of a polyvinylidene fluoride; an organophosphite antioxidant; a sterically hindered phenol antioxidant; two different polymerized C4-olefin dispersants; a polymeric dispersant that is not a polymerized C4-olefin; a micronized polyethylene wax as a matting agent; and silica as a thixotropic agent.

In an exemplary embodiment, the liquid additive composition comprises: 12 to 22 wt % of a polyvinylidene fluoride; 20 to 30 wt % of an organophosphite antioxidant; 2 to 8 wt % of a sterically hindered phenol antioxidant; 25 to 65 wt % total of two different polymerized C4-olefin dispersants; 0.3 to 3 wt % of a polymeric dispersant that is not a polymerized C4-olefin; 1 to 5 wt % of a micronized polyethylene wax as a matting agent; and 0.1 to 3 wt % of silica as a thixotropic agent.

In an exemplary embodiment, the liquid additive composition consists essentially of: 12 to 22 wt % of a polyvinylidene fluoride; 20 to 30 wt % of an organophosphite antioxidant; 2 to 8 wt % of a sterically hindered phenol antioxidant; 25 to 65 wt % total of two different polymerized C4-olefin dispersants; 0.3 to 3 wt % of a polymeric dispersant that is not a polymerized C4-olefin; 1 to 5 wt % of a micronized polyethylene wax as a matting agent; and 0.1 to 3 wt % of silica as a thixotropic agent.

In an exemplary embodiment, the liquid additive composition consists of: 12 to 22 wt % of a polyvinylidene fluoride; 20 to 30 wt % of an organophosphite antioxidant; 2 to 8 wt % of a sterically hindered phenol antioxidant; 25 to 65 wt % total of two different polymerized C4-olefin dispersants; 0.3 to 3 wt % of a polymeric dispersant that is not a polymerized C4-olefin; 1 to 5 wt % of a micronized polyethylene wax as a matting agent; and 0.1 to 3 wt % of silica as a thixotropic agent.

In a particular embodiment, the liquid additive composition comprises a polyvinylidene fluoride; an organophosphite antioxidant selected from the group consisting of Irgafos® 126 and Irgafos® 168; a sterically hindered phenol antioxidant selected from the group consisting of Irganox® 1010, Irganox® 1035, Irganox® 1076, Irganox® 1098, Irganox® 1135, Irganox® 1330, Irganox® 1425, Irganox® 1520 L, Irganox® 1726, Irganox® 245, Irganox® 245 DW, Irganox® 3114, Irganox® 565, Rianox 1076, Rianox 1098, Rianox 1790 and Rianox 3114; two polymerized C4-olefin dispersants selected from the group consisting of Indopol® L-2, Indopol® L-3, Indopol® L-6, Indopol® L-8, Indopol® L-14, Indopol® H-7, Indopol® H-8, Indopol® H-15, Indopol® H-25, Indopol® H-50, Indopol® H-100, Indopol® H-300 and Indopol® H-1200; a polymeric dispersant selected from the group consisting of Solplus™ K240, Solplus™ K241, Solplus™ K251, Solplus™ DP310, Solplus™ D320, Solplus™ D330 and Solplus™ DP700; a micronized polyethylene wax matting agent selected from the group consisting of Ceridust® 3715, Ceridust® 3716 TP, Ceridust® 3620, Ceridust® 5551 and Ceridust® 9615 A; and a silica thixotropic agent selected from the group consisting of amorphous fumed or colloidal silica.

In a particular embodiment, the liquid additive composition consists essentially of: a polyvinylidene fluoride; an organophosphite antioxidant selected from the group consisting of Irgafos® 126 and Irgafos® 168; a sterically hindered phenol antioxidant selected from the group consisting of Irganox® 1010, Irganox® 1035, Irganox® 1076, Irganox® 1098, Irganox® 1135, Irganox® 1330, Irganox® 1425, Irganox® 1520 L, Irganox® 1726, Irganox® 245, Irganox® 245 DW, Irganox® 3114, Irganox® 565, Rianox 1076, Rianox 1098, Rianox 1790 and Rianox 3114; two polymerized C4-olefin dispersants selected from the group consisting of Indopol® L-2, Indopol® L-3, Indopol® L-6, Indopol® L-8, Indopol® L-14, Indopol® H-7, Indopol® H-8, Indopol® H-15, Indopol® H-25, Indopol® H-50, Indopol® H-100, Indopol® H-300 and Indopol® H-1200; a polymeric dispersant selected from the group consisting of Solplus™ K240, Solplus™ K241, Solplus™ K251, Solplus™ DP310, Solplus™ D320, Solplus™ D330 and Solplus™ DP700; a micronized polyethylene wax matting agent selected from the group consisting of Ceridust® 3715, Ceridust® 3716 TP, Ceridust® 3620, Ceridust® 5551 and Ceridust® 9615 A; and a silica thixotropic agent selected from the group consisting of amorphous fumed or colloidal silica.

In a particular embodiment, the liquid additive composition consists of: a polyvinylidene fluoride; an organophosphite antioxidant selected from the group consisting of Irgafos® 126 and Irgafos® 168; a sterically hindered phenol antioxidant selected from the group consisting of Irganox® 1010, Irganox® 1035, Irganox® 1076, Irganox® 1098, Irganox® 1135, Irganox® 1330, Irganox® 1425, Irganox® 1520 L, Irganox® 1726, Irganox® 245, Irganox® 245 DW, Irganox® 3114, Irganox® 565, Rianox 1076, Rianox 1098, Rianox 1790 and Rianox 3114; two polymerized C4-olefin dispersants selected from the group consisting of Indopol® L-2, Indopol® L-3, Indopol® L-6, Indopol® L-8, Indopol® L-14, Indopol® H-7, Indopol® H-8, Indopol® H-15, Indopol® H-25, Indopol® H-50, Indopol® H-100, Indopol® H-300 and Indopol® H-1200; a polymeric dispersant selected from the group consisting of Solplus™ K240, Solplus™ K241, Solplus™ K251, Solplus™ DP310, Solplus™ D320, Solplus™ D330 and Solplus™ DP700; a micronized polyethylene wax matting agent selected from the group consisting of Ceridust® 3715, Ceridust® 3716 TP, Ceridust® 3620, Ceridust® 5551 and Ceridust® 9615 A; and a silica thixotropic agent selected from the group consisting of amorphous fumed or colloidal silica.

In a particular embodiment, the liquid additive composition comprises a polyvinylidene fluoride; Irgafos® 168; Indopol® H-25; Rianox 1076; Indopol® L-14; Solplus™ K240; Ceridust® 3620; and HDK® N20.

In a particular embodiment, the liquid additive composition consists essentially of a polyvinylidene fluoride; Irgafos® 168; Indopol® H-25; Rianox 1076; Indopol® L-14; Solplus™ K240; Ceridust® 3620; and HDK® N20.

In a particular embodiment, the liquid additive composition consists of a polyvinylidene fluoride; Irgafos® 168; Indopol® H-25; Rianox 1076; Indopol® L-14; Solplus™ K240; Ceridust® 3620; and HDK® N20.

In a particular embodiment, the liquid additive composition comprises Kynar Flex® 3121-50; Irgafos® 168; Indopol® H-25; Rianox 1076; and Indopol® L-14.

In a particular embodiment, the liquid additive composition consists essentially of Kynar Flex® 3121-50; Irgafos® 168; Indopol® H-25; Rianox 1076; and Indopol® L-14.

In a particular embodiment, the liquid additive composition consists of Kynar Flex® 3121-50; Irgafos® 168; Indopol® H-25; Rianox 1076; and Indopol® L-14.

In a particular embodiment, the liquid additive composition comprises Kynar Flex® 5301; Irgafos® 168; Indopol® H-25; Rianox 1076; and Indopol® L-14.

In a particular embodiment, the liquid additive composition consists essentially of Kynar Flex® 5301; Irgafos® 168; Indopol® H-25; Rianox 1076; and Indopol® L-14.

In a particular embodiment, the liquid additive composition consists of Kynar Flex® 5301; Irgafos® 168; Indopol® H-25; Rianox 1076; and Indopol® L-14.

In a particular embodiment, the liquid additive composition comprises Kynar Flex® 3121-50; Irgafos® 168; Indopol® H-25; Rianox 1076; Indopol® L-14; Solplus™ K240; Ceridust® 3620; and HDK® N20.

In a particular embodiment, the liquid additive composition consists essentially of Kynar Flex® 3121-50; Irgafos® 168; Indopol® H-25; Rianox 1076; Indopol® L-14; Solplus™ K240; Ceridust® 3620; and HDK® N20.

In a particular embodiment, the liquid additive composition consists of Kynar Flex® 3121-50; Irgafos® 168; AddVis 18; Rianox 1076; Indopol® L-14; Solplus™ K240; Ceridust® 3620; and HDK® N20.

In a particular embodiment, the liquid additive composition comprises Kynar Flex® 5301; Irgafos® 168; Indopol® H-25; Rianox 1076; Indopol® L-14; Solplus™ K240; Ceridust® 3620; and HDK® N20.

In a particular embodiment, the liquid additive composition consists essentially of Kynar Flex® 5301; Irgafos® 168; Indopol® H-25; Rianox 1076; Indopol® L-14; Solplus™ K240; Ceridust® 3620; and HDK® N20.

In a particular embodiment, the liquid additive composition consists of Kynar Flex® 5301; Irgafos® 168; Indopol® H-25; Rianox 1076; Indopol® L-14; Solplus™ K240; Ceridust® 3620; and HDK® N20.

An aspect of the present invention is an article comprising a liquid additive composition as described herein.

An aspect of the present invention is a polymer comprising a liquid additive composition as described herein.

An aspect of the present invention is a film comprising a liquid additive composition as described herein.

In an exemplary embodiment, the liquid additive composition is present in an article (such as a polymer such as a film) in an amount of 0.001 to 10% let down ratio (LDR), such as 0.005 to 5% LDR, such as 0.005 to 3% LDR, such as 0.01 to 5% LDR, such as 0.01 to 3% LDR.

In an exemplary embodiment, the organophosphite antioxidant component of the liquid additive composition is present in an article (such as a polymer such as a film) in an amount of 0.002 to 0.50 wt %, such as 0.002 to 0.4 wt %, such as 0.003 to 0.40 wt %, such as 0.003 to 0.3 wt %.

In an exemplary embodiment, the sterically hindered phenol antioxidant component of the liquid additive composition is present in an article (such as a polymer such as a film) in an amount of 0.0005 to 0.10 wt %, such as 0.0006 to 0.10 wt %, such as 0.0007 to 0.08 wt %, such as 0.0008 to 0.07 wt %.

In an exemplary embodiment, the one or more hydrocarbon polymer dispersants components of the liquid additive composition are present in an article (such as a polymer such as a film) in an amount of 0.020 to 1.0 wt %, such as 0.050 to 1.0 wt %, such as 0.050 to 0.8 wt %, such as 0.060 to 0.6 wt %.

In an exemplary embodiment, the polymeric dispersant that is not a polymerized C4-olefin components of the liquid additive composition are present in an article (such as a polymer such as a film) in an amount of 0.00001 to 0.01 wt %, such as 0.00002 to 0.01 wt %, such as 0.00003 to 0.01 wt %, such as 0.00003 to 0.009 wt %.

In an exemplary embodiment, the micronized polyethylene or polyethylene-containing wax component of the liquid additive composition is present in an article (such as a polymer such as a film) in an amount of 0.001 to 0.05 wt %, such as 0.002 to 0.04 wt %, such as 0.003 to 0.03 wt %.

In an exemplary embodiment, the silica component of the liquid additive composition is present in an article (such as a polymer such as a film) in an amount of 0.00005 to 0.010 wt %, such as 0.00007 to 0.008 wt %, such as 0.00008 to 0.007 wt %.

In an exemplary embodiment, the film is a blown film or a cast film.

An aspect of the present invention is an extruded blow molded article comprising a liquid additive composition as described herein.

An aspect of the present invention is a masterbatch comprising a liquid additive composition as described herein.

An aspect of the present invention is a process for increasing the clarity of a film, comprising adding to the film or a precursor to the film a liquid additive composition as described herein.

An aspect of the present invention is a process for improving the surface appearance of a film, comprising adding to the film or a precursor to the film a liquid additive composition as described herein.

An aspect of the present invention is a process for one or more of reducing die head build-up, increasing throughput, shortening color change transitions, reducing degradation of the product, improving batch easy flow; reducing or eliminating sharkskin defects, comprising adding a liquid additive composition as described herein during preparation of an manufactured article, such as a film.

In an exemplary embodiment, the liquid additive composition is preferred for use at processing temperatures up to 500° F. (also referred to as the "low temperature additive composition"). In a different exemplary embodiment, the liquid additive composition is preferred for use at processing temperatures greater than 500° F. (also referred to as the "high temperature additive composition"). In an exemplary embodiment, the low temperature additive composition visually provides a moderate clarifying effect, improves transmittance with increasing letdown ratio (LDR) and requires third-party pulverizing. In contrast, in an exemplary embodiment, the high temperature additive composition visually provides a significant clarifying effect, exhibits optimal transmittance at lower letdown ratio (LDR) and does not require pulverizing.

In a particular embodiment, the liquid additive composition preferred for use at processing temperatures up to 500° F. contains Kynar Flex® 5301 as the polyvinylidene fluoride component. In a particular embodiment, the liquid additive composition preferred for use at processing temperatures greater than 500° F. contains Kynar Flex® 3121 as the polyvinylidene fluoride.

An aspect of the present invention relates to a method of preparing a film that includes a step of adding the additive composition of the present invention to a resin.

In an exemplary embodiment, the film is selected from the group consisting of polypropylene (PP), chlorinated polypropylene (CLPP), linear low density polyethylene (LLDPE), high density polyethylene (HDPE), low density polyethylene (LDPE), ethylene vinyl acetate (EVA) and metallocene (mPE).

BRIEF DESCRIPTION OF THE DRAWINGS

The following figures are merely representative of particular embodiments of the present invention and are not intended to otherwise limit the scope of the invention as described herein.

DETAILED DESCRIPTION OF THE INVENTION

Figure 1:
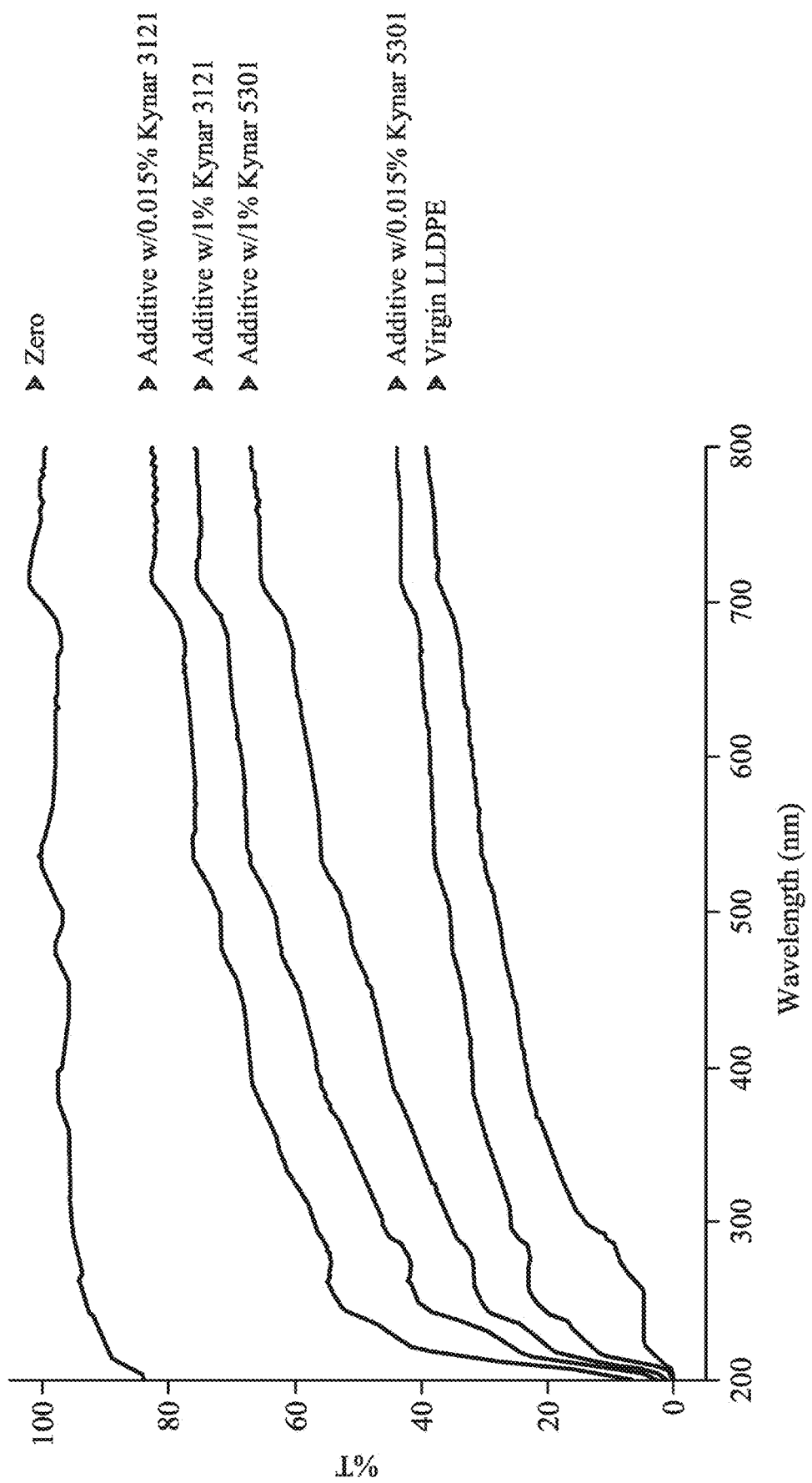
FIG. 1 illustrates the transmittance results for LLDPE films containing varying amounts of exemplary additive compositions of the invention.

The liquid additive composition of the invention imparts processing and appearance benefits in film applications. In an exemplary embodiment, the fluoropolymer component of the liquid additive composition is blended with a suitable resin to produce various film applications. The objectives for preparing articles (e.g., films) containing the liquid additive compositions include minimization of the amount of the liquid additive compositions required for the desired film characteristics in combination with lower processing temperatures and faster processing time which improves both the efficiency and productivity of the process for preparation of the additive-containing articles, and also results in reduced energy use and scrap generation. The use of smaller lot sizes also added to production flexibility.

The liquid additive composition of the invention may be in the form of a solution, a colloid or a suspension, where the form is typically temperature dependent.

In an exemplary embodiment, the desirable visual properties of a film in which the liquid additive composition of the present invention has been incorporated include improved clarity and an enhanced finished surface on the final article.

In an exemplary embodiment, the process benefits of a film in which the liquid additive composition of the present application has been incorporated include reduced or eliminated die build-up, increased throughput, uninterrupted film line processing, reduced degradation due to lower processing temperatures, shortened color change transitions and reduction of film friction (slip).

The described benefits associated with use of the additive composition of the present invention are likely due to the fact that the additive composition has an affinity to metal which allows facile coating of the processing equipment and die heads. This attribute allows for the creation of a low surface energy coating inside the processing equipment which facilitates the passage of masterbatch material through the equipment, which minimizes or eliminates undesirable blemishes (e.g., sharkskin) in the film, adds slip properties, increases throughput, reduces processing temperatures and lowers torque and psi.

Fluoropolymer Component

Polyvinylidene fluoride (PVDF) is a preferred fluoropolymer of the liquid additive composition of the present invention but other suitable fluoropolymers include polytetrafluoroethylene (PTFE), polychlorotrifluoroethylene (PCTFE) and poly(vinyl fluoride) (PVF). In an exemplary embodiment, the fluoropolymer component is present in the liquid additive composition in an amount of 12 to 22 wt %, such as 13 to 21%, such as 14 to 21%, such at 15 to 20 wt %, such as 15 to 18 wt %. Preferred polyvinylidenes include Kynar Flex® 5300, Kynar Flex® 5301, Kynar Flex® 3121-50 and Kynar Flex® 2821.

Organophosphite Component

The organophosphite component of the liquid additive composition of the present invention acts as a process stabilizer and protects polymers from molecular weight changes and from thermooxidative degradation by decomposing hydroperoxides to form non-radical, non-reactive products. Irgafos® 126 and Irgafos® 168 are preferred organophosphites and are present in the liquid additive composition in an amount of 15 to 35 wt %, such as 17 to 35 wt %, such as 19 to 33 wt %, such as 20 to 30 wt %, such as 20 to 25 wt %.

Sterically Hindered Phenol Component

The sterically hindered phenol component of the liquid additive composition of the present invention chiefly acts as a non-discoloring stabilizer against protection against thermooxidative degradation. Preferred sterically hindered phenols include Irganox® 1010, Irganox® 1035, Irganox® 1076, Irganox® 1098, Irganox® 1135, Irganox® 1330, Irganox® 1425, Irganox® 1520 L, Irganox® 1726, Irganox® 245, Irganox® 245 DW, Irganox® 3114, Irganox® 565, Rianox (Thanox) 1076, Rianox (Thanox) 1098, Rianox (Thanox) 1790 and Rianox (Thanox) 3114. The sterically hindered phenol is present in the liquid additive composition in an amount of 0.5 to 10 wt %, such as 1 to 10 wt %, such as 2 to 8 wt %, such as 3 to 7 wt %, such as 4 to 6 wt %.

Hydrocarbon Polymer Component

Polymerized C4-olefins (such as polybutene) are a preferred hydrocarbon component of the liquid additive composition of the present invention but other suitable hydrocarbon polymers include copolymers of ethylene and propylene. In a particular embodiment, the polybutene is one or more of Indopol® L-2, Indopol® L-3, Indopol® L-6, Indopol® L-8, Indopol® L-14, Indopol® H-7, Indopol® H-8, Indopol® H-15, Indopol® H-25, Indopol® H-50, Indopol® H-100, Indopol® H-300 and Indopol® H-1200. The hydrocarbon polymer is present in the liquid additive composition in an amount of 0.5 to 10 wt %, such as 1 to 10 wt %, such as 2 to 8 wt %, such as 3 to 7 wt %, such as 4 to 6 wt %.

Polymeric Dispersant Component

The polymeric dispersant component that is present in various embodiments of the liquid additive composition of the invention aids in wetting particles present in the composition, reduces particle size and/or stabilizes the particles. Preferred polymeric dispersants include Solplus™ K240, Solplus™ K241, Solplus™ K251, Solplus™ DP310, Solplus™ D320, Solplus™ D330 and Solplus™ DP700, but polyhydroxystearic acid dispersants and polyolefin amidealkeneamine dispersants are also suitable. The polymeric dispersant is present in the liquid additive composition in an amount of 0.1 to 5 wt %, such as 0.3 to 5 wt %, such as 0.5 to 5 wt %, such as 0.5 to 3 wt %, such as 0.5 to 2 wt %, such as 1 to 3 wt %.

Micronized Wax Component

Micronized waxes are most commonly a linear synthetic paraffin with a carbon number greater than 30 and provide improve anti-slip and abrasion resistance properties and matting. The preferred micronized wax component that is present in various embodiments of the liquid additive composition of the invention is a polyethylene or polyethylene-containing wax, but other suitable micronized waxes include Carnuba, ethylene bistearamide and polypropylene micronized waxes. Preferred micronized polyethylene or polyethylene-containing waxes include Ceridust® 3715, Ceridust® 3716 TP, Ceridust® 3620, Ceridust® 5551 and Ceridust® 9615 A. The micronized polyethylene or polyethylene-containing wax is present in the liquid additive composition in an amount of 0.5 to 6 wt %, such as 1 to 5 wt %, such as 1 to 4 wt %, such as 2 to 4 wt %.

Films

The liquid additive composition of the invention unexpectedly improves both the clarity of a film (such as a cast or blown film) and the film's surface appearance (such as reducing or eliminating sharkskin defects). In addition, during the preparation of a film, the presence of the liquid additive composition provides multiple advantages, such as reducing die head build-up due to the affinity of the composition to metal, increasing throughput by creating a low surface energy coating inside the processing equipment, shortening color change transitions, reducing degradation of the product; improving batch easy flow and lowering equipment torque and pressure (psi).

Letdown ratio (LDR) provides a means of identifying the concentration usage rate of the liquid additive composition of the invention. For example, use of 1 gram of the liquid additive composition for every 99 grams of the polymer/resin to be processed (100:1) results in a 1% LDR. Use of 2 grams of the liquid additive composition for every 98 grams of the polymer/resin to be processed (50:1) results in a 2% LDR and so forth. It was observed that for films, desirable results were achieved with a LDR in a range from 0.005% to 5%, such as 0.005% to 3%, such as 0.01% to 3%, such as 0.01% to 2%, such as 0.01% to 1%.

It was also unexpectedly observed that an embodiment of the liquid additive composition containing Kynar-Flex® 5301 as the polyvinylidene fluoride component was preferred for use at processing temperatures up to 500° F. (i.e., a "low temperature additive composition") while in an embodiment of the liquid additive composition containing Kynar-Flex® 3121 as the polyvinylidene fluoride component was preferred for use at processing temperatures greater than 500° F., such as up to 2000° F. (i.e., a "high temperature additive composition"). Typically, the low temperature additive composition was observed to visually provide a moderate clarifying effect, improve transmittance with increasing letdown ratios (LDR) and requires third-party pulverizing. In contrast, in an exemplary embodiment, the high temperature additive composition was typically observed to visually provide a significant clarifying effect, exhibit optimal transmittance at lower letdown ratios (LDR) and did not require pulverizing.

Masterbatches

Masterbatches consist of a polymer matrix (i.e., a carrier) and high loadings of pigments and/or other additives, where the polymer matrix is either the same as or compatible with the polymer to which the masterbatch will be added. The liquid additive compositions of the invention are suitable for enhancing the performance of a masterbatch by facilitating the passage of masterbatch material through processing equipment in which plastics are prepared. The resulting plastics typically exhibit superior properties. In an exemplary embodiment, the liquid additive composition is present in a masterbatch is in a range of 0.05 to 90% by weight, such as 1 to 80% by weight, such as 5 to 80% by weight such as 10 to 70% by weight, such as 15 to 70% by weight, such as 20 to 60% by weight, such as 25 to 55% by weight, where the % by weight is based on the total weight of the masterbatch.

Extrusion Blow Molding

The benefits achieved using the liquid additive composition of the invention during extrusion blow molding is substantially similar to the benefits achieved when using the liquid additive composition in the preparation of cast or blown films as described herein.

EXAMPLES

The liquid additive compositions were prepared with the objective of achieving homogenous rheology, suitable flow and maximum loading of ingredients. A secondary objective was to develop liquid additive compositions as liquid masterbatches that exhibit minimal or insignificant settling upon storage.

Example 1. Preparation of a "Low Temperature" Liquid Additive Composition

Indopol® H-25 Indopol® L-14 and a 1:1 mixture of Solplus™ K240 and Indopol® L-14 were mixed together to a temperature of 110° F. in a mixing container followed by the addition of Irgafos® 168, Rianox 1076, Ceridust® 3620 and pulverized Kynar-Flex® 5301. After mixing, the temperature was allowed to cool. When the temperature was below 80° F., HDK® N20 silica was added until it was evenly dispersed, with no clumps visible.

Example 2. Preparation of a "High Temperature" Liquid Additive Composition

Indopol® H-25, Indopol® L-14 and a 1:1 mixture of Solplus™ K240 and Indopol® L-14 were mixed together to a temperature of 110° F. in a mixing container followed by the addition of Irgafos® 168, Rianox 1076, Ceridust® 3620 and non-pulverized Kynar-Flex® 3121. After mixing, the temperature was allowed to cool. When the temperature was below 80° F., HDK® N20 silica was added until it was evenly dispersed, with no clumps visible.

Results and Discussion

Figure 2:
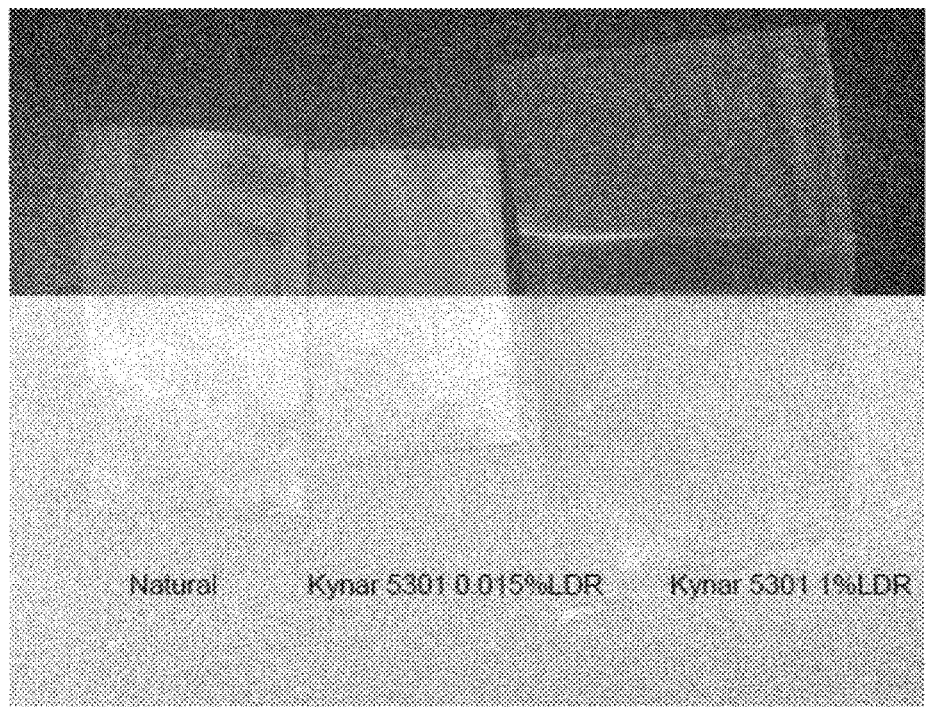
FIG. 2 illustrates the difference in the improvement in clarity in a LLDPE film containing an exemplary composition of the invention where Kynar Flex® 5301 is the polyvinylidene fluoride component and where the composition is present at 0.015% LDR and at 1% LDR.
Figure 3:
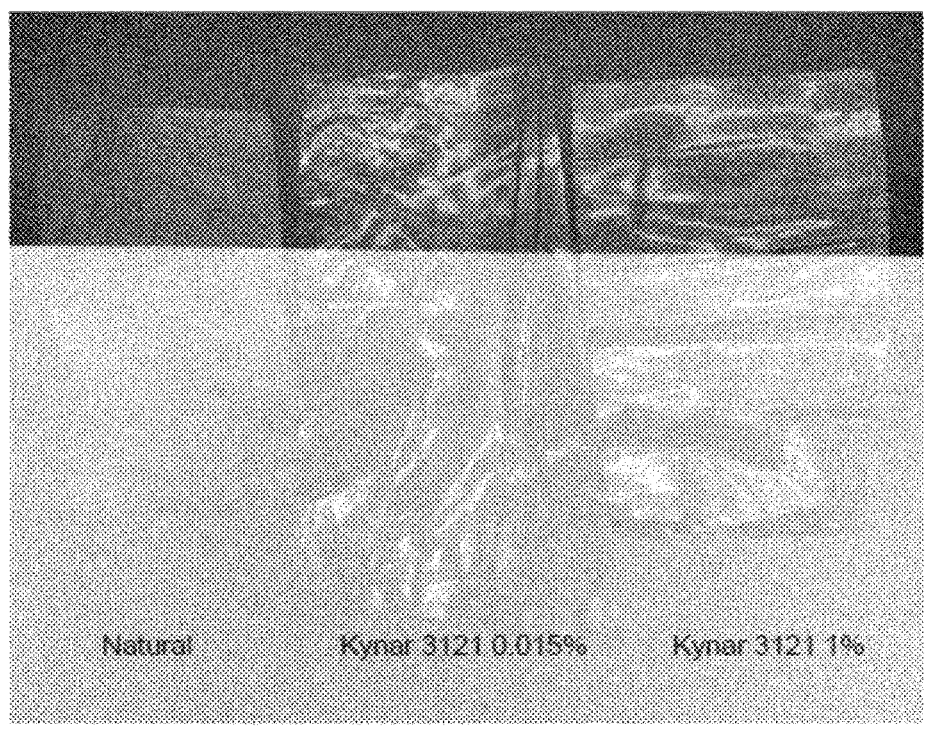
FIG. 3 illustrates the difference in the improvement in clarity in a LLDPE film containing an exemplary composition of the invention where Kynar Flex® 3121 is the polyvinylidene fluoride component and where the composition present at 0.015% LDR and at 1% LDR.

FIG. 1 shows that all of the tested additive compositions of the present invention exhibited an improved clarifying effect in LLDPE when compared to virgin LLDPE. The most significant clarifying result overall was achieved with Kynar Flex® 3121 at 0.015% LDR. The most significant clarifying result with the lowest LDR was achieved with Kynar Flex® 3121. The clarifying result achieved with Kynar Flex® 5301 was improved proportional to the LDR. FIGS. 2 and 3 show the difference in improvement in clarity in a LLDPE resin containing different amounts of an exemplary additive composition of LLDPE the present invention.

All patents/publications cited herein are incorporated by reference in their entireties.

The invention claimed is:

1. A liquid additive composition, comprising:
    a fluoropolymer;
    an organophosphite antioxidant;
    a sterically hindered phenol antioxidant;
    two different polymerized C4-olefin dispersants;
    a polymeric dispersant that is not a polymerized C4-olefin;
    a micronized polyethylene or polyethylene-containing wax; and
    silica.

2. The liquid additive composition according to claim 1, wherein the fluoropolymer is present in an amount of 10 to 25 wt %.

3. The liquid additive composition according to claim 1, wherein the organophosphite antioxidant is present in an amount of 15 to 35 wt %.

4. The liquid additive composition according to claim 1, wherein the sterically hindered phenol antioxidant is present in an amount of 0.5 to 10 wt %.

5. The liquid additive composition according to claim 1, wherein the two different polymerized C4-olefin dispersants are present in an amount of 30 to 75 wt %.

6. The liquid additive composition according to claim 1, wherein the fluoropolymer is a polyvinylidene fluoride.

7. The liquid additive composition according to claim 1, further comprising an additional antioxidant.

8. A liquid additive composition, consisting of:
    a fluoropolymer;
    an organophosphite antioxidant;
    a sterically hindered phenol antioxidant;
    two different polymerized C4-olefin dispersants;
    a polymeric dispersant that is not a polymerized C4-olefin;
    a micronized polyethylene or polyethylene-containing wax; and
    silica.

9. An article comprising the liquid additive composition according to claim 1.

10. A film comprising the liquid additive composition according to claim 1.

11. An extruded blow molded article comprising the liquid additive composition according to claim 1.

12. A masterbatch comprising the liquid additive composition according to claim 1.

13. A process for improving the surface appearance of a film, comprising adding to the film or a precursor to the film the liquid additive composition according to claim 1.

14. A method of preparing a film that includes a step of adding the liquid additive composition according to claim 1.

15. The liquid additive composition according to claim 1, wherein the polymeric dispersant that is not a polymerized C4-olefin is present in an amount of 0.1 to 5 wt %.

16. The liquid additive composition according to claim 8, wherein the fluoropolymer is present in an amount of 10 to 25 wt %.

17. The liquid additive composition according to claim 8, wherein the organophosphite antioxidant is present in an amount of 15 to 35 wt %.

18. The liquid additive composition according to claim 8, wherein the sterically hindered phenol antioxidant is present in an amount of 0.5 to 10 wt %.

19. The liquid additive composition according to claim 8, wherein the two different polymerized C4-olefin dispersants are present in an amount of 30 to 75 wt %.

20. The liquid additive composition according to claim 8, wherein the fluoropolymer is a polyvinylidene fluoride.

* * * * *